(12) United States Patent
Ostendarp et al.

(10) Patent No.: US 12,397,539 B2
(45) Date of Patent: Aug. 26, 2025

(54) APPARATUS AND METHOD FOR SEPARATING A COMPOSITE SAFETY GLASS PANEL

(71) Applicant: HEGLA GmbH & Co. KG, Beverungen (DE)

(72) Inventors: Heinrich Ostendarp, Haan (DE); Thomas Rainer, Wernigerode (DE); Andreas Luster, OT Neehausen/Volkmaritz (DE); Benjamin Thiele, Paderborn (DE)

(73) Assignee: HEGLA GmbH & Co. KG, Beverungen (DE)

( * ) Notice: Subject to any disclaimer, the term of this patent is extended or adjusted under 35 U.S.C. 154(b) by 711 days.

(21) Appl. No.: 17/424,712

(22) PCT Filed: Jan. 21, 2020

(86) PCT No.: PCT/EP2020/051441
§ 371 (c)(1),
(2) Date: Jul. 21, 2021

(87) PCT Pub. No.: WO2020/152184
PCT Pub. Date: Jul. 30, 2020

(65) Prior Publication Data
US 2022/0126403 A1    Apr. 28, 2022

(30) Foreign Application Priority Data
Jan. 22, 2019  (DE) .......................... 102019200757.0
Jun. 18, 2019  (DE) .......................... 102019116560.1

(51) Int. Cl.
*B23K 26/53* (2014.01)
*B23K 26/38* (2014.01)
(Continued)

(52) U.S. Cl.
CPC ............ *B32B 43/003* (2013.01); *B23K 26/38* (2013.01); *B23K 26/402* (2013.01); *B23K 26/53* (2015.10);
(Continued)

(58) Field of Classification Search
None
See application file for complete search history.

(56) References Cited

U.S. PATENT DOCUMENTS 5,674,414 A    10/1997  Schweizer
6,438,996 B1    8/2002  Cuvelier
(Continued)

FOREIGN PATENT DOCUMENTS

AT    403689 B  *  3/1998  ......... B32B 17/1099
AT    514428 B1 *  1/2015  ........... C03B 33/078
(Continued)

OTHER PUBLICATIONS

JP-2004182530-A Machine Translation by Clarivate Analytics retrieved Feb. 6, 2024. (Year: 2024).*
(Continued)

*Primary Examiner* — Lisa L Herring
(74) *Attorney, Agent, or Firm* — Greer, Burns & Crain, Ltd (57) ABSTRACT

An apparatus for separating a composite safety glass panel along at least one pre-definable dividing line, wherein the composite safety glass panel has at least one composite film and at least two glass panels, wherein the composite film is arranged between the glass panels and connects the glass panels to each other, the apparatus having at least one separating device for separating the glass panels along the at least one dividing line and at least one heating device for heating the composite film at least along the dividing line. The heating device has at least one laser device having at
(Continued)

least multiple adjacently arranged laser beam sources, wherein multiple adjacently arranged individual intensity profiles for heating the composite film at least along a portion of the dividing line can be produced with the laser device. The invention further relates to a method for separating a composite safety glass panel.

19 Claims, 4 Drawing Sheets

(51) Int. Cl.
  *B23K 26/402* (2014.01)
  *B23K 103/00* (2006.01)
  *B26F 3/16* (2006.01)
  *B32B 17/10* (2006.01)
  *B32B 43/00* (2006.01)
  *C03B 33/07* (2006.01)

(52) U.S. Cl.
  CPC .............. *B26F 3/16* (2013.01); *B32B 17/10* (2013.01); *C03B 33/078* (2013.01); *B23K 2103/54* (2018.08)

(56) References Cited

U.S. PATENT DOCUMENTS

| | | | |
|---|---|---|---|
| 6,451,152 B1* | 9/2002 | Holmes | B29C 66/1122 156/308.2 |
| 2007/0054443 A1* | 3/2007 | Shimomura | H01L 21/02488 438/149 |
| 2010/0196624 A1 | 8/2010 | Ruuttu et al. | |
| 2015/0179449 A1* | 6/2015 | Anikitchev | B23K 26/0736 438/799 |
| 2016/0136846 A1 | 5/2016 | Abramov et al. | |
| 2017/0066679 A1* | 3/2017 | Yeh | C03B 33/078 |
| 2020/0087193 A1* | 3/2020 | Abramov | C03B 33/0207 |
| 2022/0144684 A1* | 5/2022 | Weber | C03B 33/078 |

FOREIGN PATENT DOCUMENTS

| | | | | |
|---|---|---|---|---|
| CN | 1259924 A | | 7/2000 | |
| EP | 0836905 A1 | | 4/1998 | |
| EP | 1336591 A2 | | 8/2003 | |
| EP | 2550129 B1 | | 2/2018 | |
| JP | 2004182530 A | * | 7/2004 | ....... B32B 17/10036 |
| JP | 2005104819 A | | 4/2005 | |
| JP | 2006256907 A | | 9/2006 | |
| JP | 2010037140 A | | 2/2010 | |
| JP | 2017537867 A | | 12/2017 | |
| WO | 2010031664 A1 | | 3/2010 | |
| WO | WO-2011117006 A1 | * | 9/2011 | ......... B23K 26/0006 |
| WO | 2015117172 A1 | | 8/2015 | |
| WO | WO-2018083572 A1 | * | 5/2018 | ........... B23K 26/064 |
| WO | WO-2020078681 A1 | * | 4/2020 | ....... B32B 17/10036 |

OTHER PUBLICATIONS

AT-403689-B EPO Machine Translation Retrieved Apr. 15, 2024. (Year: 2024).*
WO-2018083572-A1 EPO Machine Translation Retrieved Apr. 16, 2024. (Year: 2024).*
WO-2011117006-A1 EPO Machine Translation Retrieved Apr. 17, 2024. (Year: 2024).*
WO-2020078681A1 Clarivate Analytics Machine Translation Retrieved Sep. 10, 2024. (Year: 2024).*
AT514428-B1 Clarivate Analytics Machine Translation retrieved Sep. 10, 2024. (Year: 2024).*
WO2015/117172A1 EPO Machine Translation Retrieved Feb. 12, 2025. (Year: 2025).*
Chinese Pat. App. No. 202080015758.6: Office Action dated Feb. 25, 2023 (17 pages).
PCT/EP2020/051441 English translation of International Preliminary Report on Patentability (IPRP), 7 pages (Jul. 22, 2021).
Singapore Patent Application No. 11202107998Y: Office Action dated Dec. 21, 2022 (9 pages).
Canadian Office Action for corresponding CA Patent Application No. 3,127,262 dated Jan. 10, 2023 (6 pages).
Japanese Patent Application No. 2021-542326: Translated Office Action dated Nov. 29, 2022 (6 pages).
EA 202192035: Office Action translation issued on Apr. 19, 2022 which claims priority to or is a national filing of EP2020/051441 (1 page).
IN 202117034646: Examination Report translation issued Mar. 7, 2022 in the counterpart Indian patent application (6 pages).
Mexican Patent Application No. MX/a/2021/008784: Office Action and English translation of Office Action, Apr. 22, 2025 (8 pages).

* cited by examiner

APPARATUS AND METHOD FOR SEPARATING A COMPOSITE SAFETY GLASS PANEL

The invention relates to a device for separating a composite safety glass panel along at least one predefinable dividing line, in particular to separate a composite safety glass sheet therefrom. The composite safety glass panel has at least one composite film and at least two glass panels, wherein the composite film is placed between the glass panels and the composite film joins the glass panels to one another. The device also has at least one separating means for separating glass panels along the at least one dividing line, preferably by scoring and subsequently breaking it. The device also has at least one heating means that is used to heat the composite film at least along the dividing line.

The invention also relates to a method for separating a composite safety glass panel, wherein the method comprises at least the following steps:
  separating the two glass panels, in particular through mechanical scoring and breaking, along at least one predefinable dividing line,
  heating the composite film along the dividing line, in particular with a heating means,
  pulling the glass panels apart along the dividing line, in particular substantially orthogonal to the dividing line.

A composite safety glass pane is understood in general to be a glass sheet formed from two or more glass panels of the same or different thicknesses, wherein the glass panels are joined to one another by an intermediate layer made of plastic. Special composite safety glass panels contain, e.g. a first glass panel normally made of uncoated glass and a second glass panel made of a second glass, coated on the outer surface, in particular with a thermal protection layer. The two glass panels are glued together with a composite film.

In composite safety glass, the intermediate layer for joining the individual glass panels is normally made of an elastic, tear-resistant high polymer film, such that when the glass panels break, the shards adhere to the composite film. This reduces the risk of injury in the form of cuts or stabbing. The composite safety glass panel also still exhibits a load-supporting capacity after the break.

The composite film is normally 0.38 mm thick, or a multiple thereof, e.g. 0.76 mm, etc. Aside from composite films made of polyvinyl butyral (PVB), composite films made of an ethylene-vinyl acetate (EVA) copolymer are also used to a lesser extent.

The composite safety glass sheets are not produced individually in the desired format in a typical production variant, but instead are separated out of large format composite safety glass panels, in particular by cutting them therefrom, in that the composite safety glass panel is separated along at least one dividing line.

The composite safety glass sheets are separated out through a separate separation of the glass panels, frequently by scoring them along the dividing line and subsequently breaking the glass panels. The composite film is heated, for example, for the separation, so that the film is separated while it is soft, e.g. by cutting it with a knife. In other methods, the composite film is entirely vaporized in advance by means of a laser. An exemplary method is disclosed in EP 2 550 129 B1.

The methods and devices known from the prior art have the disadvantage that, in particular, the heating times for heating the composite film for a plastic deformation and subsequent cutting with a knife are very long, thus delaying the separating process on the whole.

The fundamental object of the present invention is therefore to create a method and a device for separating a composite safety glass panel with which the cycle times for the separation are shortened.

This object is achieved with a device of this type according to the characterizing portion of claim 1 in that the heating means contains at least one laser device that has multiple adjacent laser beam sources. Multiple adjacent individual intensity profiles can be generated with the laser device to heat the composite film at least along one segment of the dividing line. The "individual intensity profile" describes the contour of the laser beams striking the surface of the composite safety glass panel, in particular in a perpendicular view of the surface from above. A laser beam source generates, for example, multiple individual intensity profiles, e.g. one individual intensity profile per laser diode, or each laser beam source generates a single individual intensity profile, e.g. an individual intensity profile comprised of all of the laser diodes in a laser beam source.

An individual intensity profile is substantially in the form of a dot, oval, ellipse, or line—individual laser line—by way of example, in particular when viewed from above. The individual laser lines are substantially parallel to the dividing line, at an angle to the dividing line, or orthogonal to the dividing line. The individual intensity profiles, in particular the individual laser lines, are arranged adjacently to one another on an imaginary axis, wherein the imaginary axis substantially follows the dividing line. "Arranged adjacently to one another" means that the individual intensity profiles are arranged such that they follow one another at substantially uniform spacings, preferably along the dividing line.

An individual laser line extends to a greater extent longitudinally than laterally. If the individual intensity profiles form individual laser lines, these are preferably arranged such that they follow one another longitudinally. The "length" and "width" of an individual intensity profile always refer to the length or width of an individual intensity profile on the surface, or where it passes through the surface, of the composite safety glass panel. Preferably, the length and/or width, or the diameter on a power inclusion relates to approx. 86.5% of the power. In particular if there is an "overlapping," the regions with a power inclusion of 86.5% of the power preferably overlap, at least in part.

It is also provided that the individual laser lines are arranged successively laterally. It is preferred in this variant that the lengths correspond to approximately twice or three times the width, in particular with a preferred width of approx. 1 mm. The diameter of a punctiform individual intensity profile ranges from 1 mm to 4 mm, for example, and is preferably 3 mm. With oval or elliptical individual intensity profiles, the width corresponds to the width at the widest point. By way of example, the individual intensity profiles, in particular the individual laser lines, are arranged at a distance to one another.

The lengths of individual laser lines preferably correspond to approximately three times to 20 times the width of an individual laser line. This is the case in particular when the individual laser line is parallel to the dividing line. The width of an individual laser line is preferably approx. 3 mm. In particular, the length of an individual laser line is between 6 mm and 60 mm, in particular approx. 30 mm.

According to a first advantageous embodiment, the multiple adjacent individual intensity profiles, in particular the individual laser lines, form a, preferably continuous, laser line. The laser line is formed by the multiple individual intensity profiles, in particular the multiple individual laser lines, along at least a segment of the dividing line. The lengths of the laser lines can be arbitrarily adapted to the number of laser beam sources or individual intensity profiles, i.e. individual laser lines.

In particular for homogenizing the beam intensity over the course of the laser lines, it has proven to be advantageous if the individual intensity profiles, in particular the individual laser lines, overlap at least in part at their edges. Because of the intensity distribution of the beam from a laser beam source, the beam intensity is reduced at the edges of the individual intensity profiles, in particular the individual laser lines. To also ensure a homogenous application of energy into the composite film, the individual intensity profiles, in particular the individual laser lines, overlap at least in part. Individual laser lines overlap longitudinally at the bordering edges of each pair of individual laser lines. Alternatively, the individual intensity profiles, in particular the individual laser lines, can also be directly adjacent to one another.

The laser device is supported such that the multiple individual intensity profiles, in particular the multiple individual laser lines, or the laser line, can be generated along at least a segment of the dividing line, preferably at least along the entire length of the dividing line. By way of example, at least the laser device is supported such that it can move, so that the laser beam sources can be positioned such that the multiple individual intensity profiles, in particular the multiple individual laser lines, or the laser line, extend(s) along the dividing line, i.e. substantially coaxial to the dividing line.

The laser device is preferably supported in an adjustable manner, such that the multiple individual intensity profiles, in particular the multiple individual laser lines, or the laser line, can be guided on the composite safety glass panel, preferably in a direction orthogonal to the dividing line.

The multiple individual intensity profiles, in particular the multiple individual laser lines, or the laser line, are preferably slightly offset to the dividing line, in particular by between 0.1 mm and 0.7 mm, preferably 0.5 mm, to the dividing line. This offset ensures that the multiple individual intensity profiles, in particular the multiple individual laser lines, or the laser line, remains on at least one edge of the glass panel during the separation of the glass plates. A part of the composite safety glass panel is preferably held in place during the separation, and the other part is moved away. The offset is normally in the direction in which the section of the composite safety glass panel is moved away during the separation. This ensures that a maximum laser power enters the gap obtained between the sections of the composite safety glass panel.

It is particularly preferred that the positions of the multiple individual intensity profiles, in particular the multiple individual laser lines, or the laser line, can be adjusted orthogonally to the dividing line such that the multiple individual intensity profiles can be held in an optimal position, in particular on at least one edge of the glass panel, when the edge of the glass panel edge moves.

In another embodiment of the device, the laser device has at least one beam-shaping assembly for forming the laser lines. A "laser beam source" is understood to mean a laser beam source as set forth in the present invention that does not contain a beam-shaping assembly, but instead a laser beam source on which a beam-shaping assembly can be placed. The beam-shaping assembly is dedicated either to the individual laser beam source itself, or a single beam-shaping assembly shapes the laser beams from multiple laser beam sources.

The laser beams emitted from the laser beam sources form the multiple individual intensity profiles, in particular the multiple individual laser lines, or the laser line, for heating the composite film. By way of example, the beam-shaping assembly forms the emitted laser beam and shapes the multiple individual intensity profiles, in particular the multiple individual laser lines, or the laser line. The beam-shaping assembly contains, e.g. a collimator lens that shapes the beam along at least one axis, preferably two axes.

The laser beam is shaped along at least one axis, such that it is oriented substantially parallel in at least one axis, to form the multiple individual intensity profiles, in particular to form the multiple individual laser lines or the laser line. A very low divergence of up to approx. 6° is also regarded as substantially parallel, because the distance to the laser device, in particular the beam-shaping assembly, does not exceed a distance to the surface of the composite glass panel of approx. 100 mm to 150 mm. There is preferably a maximum divergence of up to 6° at distances of the beam-shaping assembly to the surface of the composite safety glass panel between 30 mm and 50 mm, and a maximum divergence of up to 2° at distances to the beam-shaping assembly between 100 mm and 150 mm.

"Individual laser line" or the "laser line," as set forth in this patent application, are understood to be a line-shaped, in particular homogenous, beam profile, which forms a line when projected onto a surface, e.g. the surface of the composite safety glass panel. A line is understood to be any beam profile that extends longitudinally substantially more than laterally. The laser device emits a laser beam line formed by the multiple individual laser lines, which extends at least along a segment of the dividing line, and in particular forms the laser line. An individual laser line is formed, e.g., in that the laser beam emitted from a laser beam source is formed in the manner of a fan angle to a line. The multiple individual laser lines, in particular the laser line, preferably extend along an imaginary axis that is aligned with the dividing line, or is slightly offset thereto, as described above.

The multiple individual intensity profiles, in particular the multiple individual laser lines, or the laser line, is substantially between 1 mm and 5 mm wide, preferably approx. 3 mm wide, wherein the width is preferably measured where it enters the surface of the composite safety glass panel. The distance from the laser device to the surface of the composite safety glass panel, in particular the distance from the beam-shaping assembly, in particular a lens assembly, or a lens, to the surface of the composite safety glass panel is between 25 mm and 150 mm, in particular approx. 70 mm, when in operation.

The laser beam sources are preferably arranged adjacently along an imaginary axis. The distance between the center lines of two laser beam sources is preferably between 20 mm and 100 mm, in particular between 30 mm and 40 mm, preferably approx. 50 mm. By way of example, the individual laser beam sources, in particular the beam-shaping assembly, are fixed in place. At least five, preferably 5 to 150, laser beam sources are advantageously arranged adjacently to one another. Consequently, 5 or 5 to 150 individual intensity profiles, in particular individual laser lines, are formed.

The multiple individual intensity profiles, in particular the multiple individual laser lines, or the laser line, formed by the multiple laser beam sources, are used to heat the composite film to a temperature at which the composite film can be deformed thermoplastically, in particular such that the glass panels forming the composite safety glass panel can at least be separated from one another along the dividing line.

The heating of the composite film takes place until a temperature is reached at which the composite film is thermoplastically heated and becomes soft, but preferably at which no irreversibly damage to the composite film occurs.

This heating is advantageously reversible with respect to the composite film. In particular, the heating takes place such that no volatile substances are evaporated from the composite film, e.g. softening agents. The separation takes place advantageously such that the composite film can be separated with a knife along the dividing line between the glass panels after the two composite safety glass panel halves have been pulled apart during the thermoplastic deformation of the film between the composite safety glass panel halves.

The device is suitable in particular for straight separating cuts, and has the advantage over the prior art that in comparison with heating means known from the prior art, e.g. infrared projectors with reflectors, the heating can follow a narrow path in a targeted manner, such that the composite film remains unaffected, or is only slightly affected, outside the separating region. In particular, there is no unintentional delamination of the composite film from the glass panels in the edge regions. Consequently, channels are not formed that would allow ingress of liquids and gasses from the environment, and no tensions are generated in the glass panels in the edge regions thereof. The device is therefore suitable in particular for separating very thin composite safety glass panels, e.g. from the automotive industry or for entertainment electronics, in particular flat screens.

Furthermore, the heating along the dividing line can take place significantly more quickly with the device than with heating means known from the prior art, such that the cycle times for a complete separation process along the dividing line can be reduced by at least 30% to 70%.

Another advantage is that existing facilities can be retrofitted with a laser device, e.g. replacing existing infrared projectors, such that the effectiveness of a facility can be increased.

The shape of the multiple individual intensity profiles, in particular the multiple individual laser lines, or the laser line, is preferably further formed in that the beam-shaping assembly contains a lens assembly. Alternatively or additionally, the beam-shaping assembly may contain other optical means for beam shaping, in particular at least one semipermeable mirror.

By way of example, the beam-shaping assembly contains at least one lens, in particular a cylindrical lens, preferably an aspherical cylindrical lens, for at least multiple laser beam sources. A lens is dedicated, for example, to a group of two to five laser beam sources.

Alternatively, at least one lens can be provided for each individual laser beam source, in particular a cylindrical lens, preferably an aspherical cylindrical lens. The length of the lens is between 10 mm and 15 mm, for example. At least one lens is placed directly at a laser beam source, for example, in particular glued or soldered thereto.

Depending on the design and shape of the lens, it is attached such that the individual intensity profiles, in particular individual laser lines, or the laser line, are formed by the lens, or the lenses. The lens or lenses preferably focus the beam from a laser beam source, or multiple laser beam sources, onto an axis in order to form the multiple individual intensity profiles, in particular the individual laser lines, or the laser line. The second axis remains entirely divergent, i.e. the way the laser beam exits the laser beam source, e.g. at an angle of 10° to 20°, or it is likewise shaped.

In order to reduce the effects of fluctuations in the distance between the laser device and the composite safety glass panel, the beam-shaping assembly forms the multiple individual intensity profiles, in particular the multiple individual laser lines, or the laser line, from at least one beam that is substantially parallel in the direction of one axis. The lens assembly preferably functions as a collimator and aligns the emitted radiation to form a laser beam with a substantially constant width along one axis, which generates multiple individual intensity profiles, preferably multiple individual laser lines, or the laser line, on the composite safety glass panel. The multiple individual intensity profiles, in particular the multiple individual laser lines, or the laser line, consequently pass through the composite safety glass at a substantially constant width.

A constant width of the laser line is ensured in particular when the individual intensity profiles, in particular the individual laser lines, overlap. A slight variation in the width may be caused by the substantially linear, elliptical shape of the individual intensity profiles, in particular the individual laser lines, described below. A slightly divergent beam starting from the beam-shaping assembly is also regarded as substantially parallel, e.g. a widening of approx. 1.5 mm of the width of the laser line along a distance of approx. 70 mm, i.e. the distance from the beam-shaping assembly to the surface of the composite safety glass panel.

The multiple individual intensity profiles, in particular the multiple individual laser lines, or the laser line, are consequently not focused onto the composite film, but instead have a constant width obtained by substantially parallel laser beams. In particular, the multiple individual intensity profiles, in particular the multiple individual laser lines, or the laser line, is formed by beams that are entirely parallel along at least one axis.

This exemplary embodiment has the advantage that the laser beam is partially reflected back after passing through the composite film, and in turn absorbed at least in part in the composite film. This advantage is reinforced in particular by existing glass coatings. The device preferably has a mirror, and the mirror is placed on the side of the composite safety glass panel facing away from the laser beam sources. The mirror reflects the transmitted beams, such that these pass through the composite safety glass panel again, and can be at least partially absorbed in the composite film along the dividing line.

Another embodiment of the device provides that the combined length of the multiple individual intensity profiles, in particular the combined length of the multiple individual laser lines, or the length of the laser line, is at least 30 times the diameter of an individual intensity profile, or the width of an individual intensity profile, or the width of an individual laser line, in particular the width of the laser line. The combined length of the multiple individual intensity profiles, in particular individual laser lines, corresponds to the combined lengths or diameters of the individual intensity profiles, or individual laser lines, when these are directly adjacent to one another; corresponds to the combined diameters or lengths of the individual intensity profiles, in particular the individual laser lines, plus the distances between the individual intensity profiles if they are spaced apart; corresponds to the length from the start of the first individual intensity profile, in particular the first individual laser line, to the end of the last individual intensity profile, in particular the last individual laser line, if the individual intensity profiles, in particular the individual laser lines, overlap. This also corresponds to the length of the laser line.

Therefore, if the width or diameter of an individual intensity profile, in particular the width of an individual laser line, is approx. 3 mm, the combined length of the multiple individual intensity profiles, in particular the multiple individual laser lines, or the laser line, is at least approx. 100 mm with a factor of 33. Advantageously, it is also provided that the combined length of the multiple individual intensity profiles, in particular the combined length of the multiple individual laser lines, or the laser line, corresponds to between 30 times and 1700 times, preferably between 30 times and 333 times, in particular 100 times, the width or diameter of an individual intensity profile, in particular the width of an individual laser line, or the laser line. With a width or diameter of approx. 3 mm, this comes to approx. 90 mm to 5100 mm, or approx. 300 mm.

It is also provided that the laser device is designed and arranged such that the combined length of the multiple individual intensity profiles, in particular the combined length of the multiple individual laser lines, or the length of the laser line, corresponds at least to the length of the overall extension of the dividing line. The length preferably corresponds to 1.5 times the length of the dividing line, for example. With typical glass widths, the length of the dividing line is normally 100 mm to 5000 mm, in particular 3200 mm or 4700 mm.

Another embodiment of the device provides that the individual intensity profiles, in particular the individual laser lines, or the laser line, are entirely straight, or that at least one individual intensity profile, in particular one individual laser line, or the laser line, is curved, at least in part. By way of example, the beam-shaping assembly is designed and configured, at least in part, such that a curved individual intensity profile, in particular a curved individual laser line, or an individual intensity profile, in particular an individual laser line, can be obtained with a radius. In this manner, dividing lines exhibiting a curve or radius can also be heated according to the invention. In particular, the individual intensity profiles, in particular the individual laser lines, are curved in the edge regions. This has the advantage that the dividing line can be obtained, for example, in the edge region. By way of example, it is provided that multiple individual intensity profiles can be arranged adjacently to one another on a curved pathway.

Laser diodes have proven to be advantageous laser beam sources in another embodiment of the design. It is provided that each laser beam source contains at least one laser diode. A laser diode with a collimator, in this case the beam-shaping assembly, in particular the lens assembly, or lens, forms a diode laser. Each laser beam source preferably has an assembly comprised of multiple laser diodes, or a laser diode stack. In particular, each laser beam source with a beam-shaping assembly forms a diode laser.

A laser diode, in particular bar-shaped laser diodes, normally emits an elliptical beam profile. This beam profile is then shaped into a very elongated ellipse, substantially forming a line, by the beam-shaping assembly, in particular the lens dedicated to the laser diode. The laser line, or the individual intensity profiles, in particular the individual laser lines, is preferably formed in this manner. The profile of an individual laser line has the shape of a very elongated—linear—ellipse, for example.

According to one embodiment, a laser beam source has an output of 5 to 50 watts, wherein the wavelength of the emitted laser beam ranges from 1200 nm to 2200 nm. In this range, the composite film exhibits absorption properties that ensure an advantageous plasticization of the film by the multiple individual intensity profiles, in particular the multiple individual laser lines, or the laser line. The wavelength is preferably between 1300 nm and 2100 nm.

By way of example, in order to homogenize the beam intensity along the dividing line, it is provided according to another embodiment of the device that the laser device, in particular the laser beam sources and/or the beam-shaping assembly, is supported such that it can be oscillated and/or moved, preferably in a direction parallel to the extension of the dividing line. The laser device is preferably supported such that it can be oscillated and/or moved in the longitudinal direction of the multiple individual intensity profiles, in particular the multiple individual laser lines, or the laser line. An advantageous heating is ensured by the oscillation in the regions between two individual intensity profiles, in particular individual laser lines, if the individual intensity profiles, in particular the individual laser lines, are spaced apart from one another.

The amplitude ranges from a few millimeters to a few centimeters. It is also provided that the amplitude corresponds to half the distance between two center lines from two laser beam sources, e.g. resulting in an amplitude of approx. 25 mm. It is also provided that the amplitude corresponds to a multiple of half the distance between two center lines through two laser beam sources. By way of example, the amplitude corresponds to half the distance, the entire distance, or 1.5 times the distance between two individual intensity profiles, in particular individual laser lines.

The heat produced by the laser beams from the individual laser beam sources along the dividing line—the individual intensity profiles or individual laser lines—covers the entire dividing line due to the oscillation, such that the heat introduced into the composite film becomes homogenized over the course of multiple oscillations or passes.

It is also provided that the amplitude corresponds to less than half the distance, in particular a fraction of half the distance, between two center lines through two laser beam sources. The oscillation path is preferably less than the distance between to center lines through two laser beam sources. In particular, the oscillation path is 70% to 98% of the distance between two center lines through two laser beam sources, or the amplitude is between 35% and 49% of the distance between two center lines through two laser beam sources.

It is also provided that a laser device that has multiple laser beam sources oscillates, and/or is moved, along the dividing line. By way of example, about five laser beam sources are arranged adjacently on an imaginary axis. The laser device is supported such that it can oscillate or move along the dividing line, such that the composite film can be heated along the entire extension of the dividing line. At least part of the laser device is moved at least once, preferably multiple times, along the entire extension of the dividing line in order to heat the composite film.

This exemplary embodiment has, among others, the advantage that inhomogeneities caused by a single laser diode can be compensated for. These are normally inhomogeneities that are caused by individual laser diodes, in particular by individual intensity profiles that differ from one another. If individual laser diodes malfunction, or there are differences in quality, these are also compensated for. The laser diodes therefore do not need to be selected.

According to an alternative embodiment, it is also provided that the laser beam sources are punctiform laser sources, or combined to form a dot by a beam-shaping assembly, and oscillate at a high frequency, e.g. with an amplitude of approx. 2 mm to 10 mm, to generate an individual intensity profile, in particular an individual laser line. Each laser beam source can oscillate separately, such that on the whole, multiple individual intensity profiles, in particular a laser line, are obtained along the dividing line through high frequency oscillation of the laser beam sources. The beam-shaping assembly is stationary for this, or can likewise oscillate.

In particular to adjust the length of the combined multiple individual intensity profiles, in particular the combined length of the multiple individual laser lines, or the length of the laser line, to the width or length of a composite safety glass panel that is to be separated, it is provided according to another embodiment that the laser beam sources can be controlled individually. Individual laser beam sources are switched on or off to lengthen or shorten the length of the combined multiple individual intensity profiles, in particular the combined length of the multiple individual laser lines, or the length of the laser line, along the dividing line.

It is also provided that the laser beam sources can be rotated, in particular up to 90°, in order to align them along the dividing line. This is advantageous in particular with short individual laser lines, e.g. having a width of approx. 1 mm and a length of approx. 3 mm.

It is also provided that the laser beam sources can be controlled in groups in order to set the length of the combined multiple individual intensity profiles, in particular the combined length of the multiple individual laser lines, or the length of the laser line. By way of example, the multiple individual intensity profiles, in particular the laser lines, can be switched on and off in meter increments.

The device is designed and configured in particular to execute the method described below.

The aforementioned object of the invention is also achieved by a method for separating a composite safety glass panel, which comprises the following steps:

separating, in particular scoring and breaking, the two glass panels along at least one predefinable dividing line;
heating the composite film along the dividing line;
pulling apart the glass panel along the dividing line;
separating the composite film.

It is provided that the individual steps can be executed simultaneously, at least in part. The heating of the composite film takes place according to the invention with multiple adjacently arranged individual intensity profiles, in particular multiple individual laser lines, or a laser line, along at least a segment of the dividing line using a laser device that has multiple adjacently arranged laser beam sources. The method is preferably executed with the device described above. The laser device preferably contains at least one beam-shaping assembly.

The two glass panels are advantageously separated in that they are first scored, in particular mechanically scored, and subsequently broken. The scoring and breaking takes place along the at least one dividing line. The composite film remains unaffected by the separating of the glass panels. The composite film is advantageously heated after or during the separation, in particular the breaking. By way of example, this heating can take place at the same time as the breaking of one or both panels, or at the start of the breaking process. The heating of the composite film takes place at a temperature at which the composite film becomes soft, without irreversibly damaging the composite film. The heating of the composite film can be advantageously reversed.

When the composite film has been heated to a sufficient temperature, e.g. between 150° C. and 230° C., in particular approx. 170° C., 180° C., or 190° C., the glass panels can be pulled apart along the dividing line, in particular in a direction orthogonal to the dividing line. By way of example, a cutting tool can then be inserted between the glass panels, in order to separate the composite film. This cutting tool is preferably a knife or blade.

According to the invention, it is provided that multiple individual intensity profiles, in particular multiple individual laser lines, or one laser line, are generated along the dividing line with a laser device that has multiple adjacently arranged laser beam sources, and preferably has at least one beam-shaping assembly, in particular a collimator lens, to heat the composite film. The multiple individual intensity profiles, in particular the multiple individual laser lines, or the laser line, are projected—as described above—along at least a segment of the dividing line, or moved along the dividing line, when the combined length of the multiple individual intensity profiles, in particular the combined length of the multiple individual laser lines, or the length of the laser line, does not correspond to the entire extension of the dividing line, such that the composite film is heated along the dividing line by the laser beams from the laser beam sources.

The multiple individual intensity profiles, in particular the multiple individual laser lines, preferably collectively form a laser line in that the individual intensity profiles are arranged such that they are immediately adjacent to one another, or the individual intensity profiles overlap in part in the longitudinal direction of the dividing line. The laser line is advantageously used to heat the composite film.

According to one embodiment of the method, it is provided that the heating of the composite film takes place prior to pulling the glass panels apart. It is also provided according to one embodiment that a separation of the composite film takes place by the pulling apart after the heating. The film is advantageously softened by the heating, such that it becomes separated by the pulling apart.

The heating of the composite film along the dividing line takes place with the laser beams from the multiple laser beam sources, wherein the beam-shaping assembly forms the multiple individual intensity profiles, in particular the multiple individual laser lines, or the laser line, from substantially parallel radiation in the plane that runs perpendicular to the dividing line. The beam path for the individual intensity profiles, in particular the individual laser lines or the laser line, is therefore substantially parallel through the composite safety glass in the framework of the combined width and length of the multiple individual intensity profiles, in particular the combined length of the multiple individual laser lines or the length of the laser line.

One embodiment of the method also provides that the separation of the glass panels takes place through a mechanical scoring and by heating the composite film. The two glass panels are consequently first mechanically scored. Compressive stresses are generated in the film, and tensile stresses are generated in the glass panels by the quick heating of the composite film in order to separate the composite film. The compressive stresses in the glass are then great enough, in particular with thin glass panels, that the glass panels automatically break along the scoring line.

It is also provided according to one embodiment that the separation of the glass panels takes place by scoring with at least one laser, in particular through filamentation, and by heating the composite film. The glass panels are consequently first mechanically weakened along the at least one dividing line by a laser. This mechanical weakening preferably takes place through filamentation.

By way of example, the filamentation takes place with a laser that has a laser wavelength of 1 μm or less. Ultrashort laser pulses are used for the filamentation, in order to exceed a threshold intensity in the focal point of the laser. Even though the glass panels do not actually absorb these wavelengths, this results in an absorption of the laser radiation. The filamentation exploits so-called nonlinear optical effects in the glass panels. When absorbed, a type of stress curtain is formed along the dividing line, at which the glass panels break. As with thermally induced laser separation, the filamentation functions best with glass panels of larger sizes, because local stress introduced therein result more quickly in a targeted break. The final breaking of the glass panels by the stresses introduced in the framework of the heating of the composite film takes place subsequently.

In the framework of the method, the multiple individual intensity profiles, in particular the individual laser lines, or the laser line, advantageously extend along the entire length of the dividing line, or along a segment of the dividing line, as described above in reference to the device.

The object is also achieved with a device for processing, in particular a composite safety glass panel, along at least one predefinable processing line. The processing line is the dividing line, for example, or a line, along which the at least two sections of a composite safety glass panel are connected, or another material that is to be heated. The device contains at least one heating means for heating along at least one segment of the processing line, that contains at least one laser device that has at least multiple adjacently arranged laser beam sources.

Multiple adjacently arranged individual intensity profiles can be generated with the laser device to heat at least one segment of the processing line. The device also contains the features and embodiments described above for the separating device. This applies in particular to the type, design and arrangement of the laser device, as well as, in particular, the oscillation or mobility. The description in reference to the dividing line can be applied to a processing line. Furthermore, the heating of the composite film can be applied to any arbitrary material that is to be heated along a processing line, and which absorbs laser radiation.

In particular, use of the device described above for joining at least two sections of composite safety glass has proven to be advantageous, in particular to heat the composite film for bonding purposes.

Furthermore, the device can be used to preheat a composite film in particular along a processing line, in particular a dividing line. By way of example, energy is absorbed along the processing line after preheating by other means, e.g. a focused laser.

In detail, there are now multiple design and development possibilities for the device and method according to the invention. Reference is made in this regard to both the dependent claims and the following description of preferred exemplary embodiments in conjunction with the drawings.

Therein.

Figure 1:
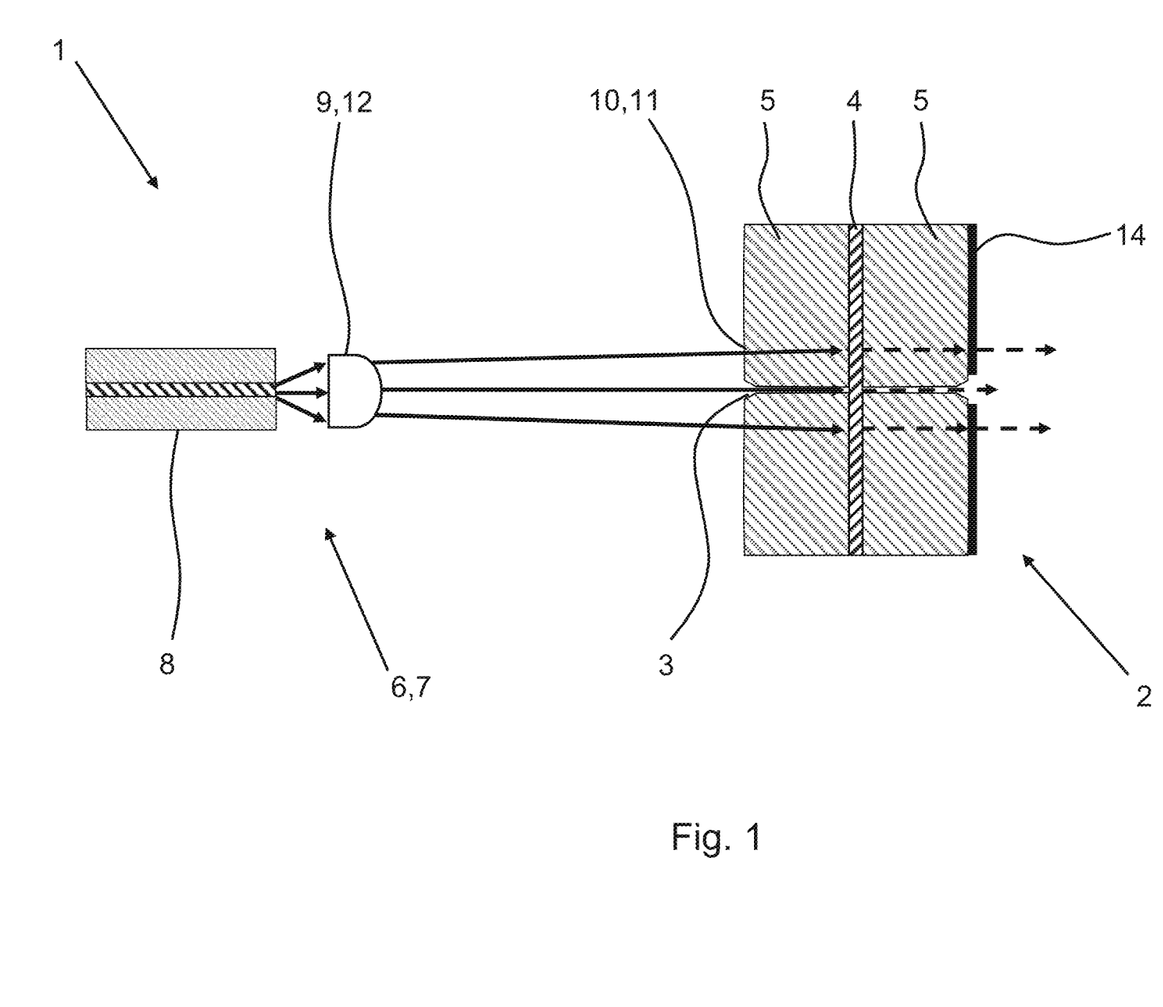
FIG. 1 shows an exemplary embodiment of a device, in a partially cutaway side view.

FIG. 1 shows an exemplary embodiment of a part of a device 1 for separating a composite safety glass panel 2 along at least one predefinable dividing line 3. The device 1 is shown in an at least partially cutaway side view in a plane perpendicular to the dividing line. The composite safety glass panel 2 comprises at least one composite film 4 and at least to glass panels 5. The composite film 4 is located between the glass panels 5 and bonds these to one another.

To be able to heat the composite film 4 at least along the dividing line 3 to a temperature at which the composite film 4 is sufficiently soft along the dividing line 3, in order to be able to deform it, the device 1 contains a heating means 6, which is a laser device 7 in this exemplary embodiment. The laser device 7 contains multiple adjacently arranged laser beam sources 8 in the form of laser diodes and a beam-shaping assembly 9. The laser device 7 generates multiple individual intensity profiles 11—also shown in particular in FIG. 2—which form individual laser lines in this exemplary embodiment, and which form at least one laser line 10 along the dividing line 3 for heating the composite film 4.

FIG. 1 shows a lateral projection perspective of the laser line 10, or an individual intensity profile 11, from which it can be seen schematically that the beam-shaping assembly 9 acts as a collimator, and that aligns the laser radiation such that it is substantially parallel—with a slight divergence—at least in the direction of extension, along the dividing line 3, such that an individual intensity profile 11, or a laser line 10 here, is obtained that has a constant width. The "width" of the individual intensity profile 11 or the laser line 10 refers to its extension in the direction orthogonal to the dividing line 3. According to FIG. 1, the width of the individual intensity profile 11, or the laser line 10, can be seen schematically below and above the separation between the glass panels 5. The width is measured on the surface of the composite safety glass panel 2. One of the glass panels 5 has an outer coating 14 on which the laser beam that has passed through the composite safety glass panel 2 is at least partially reflected.

Figure 2:
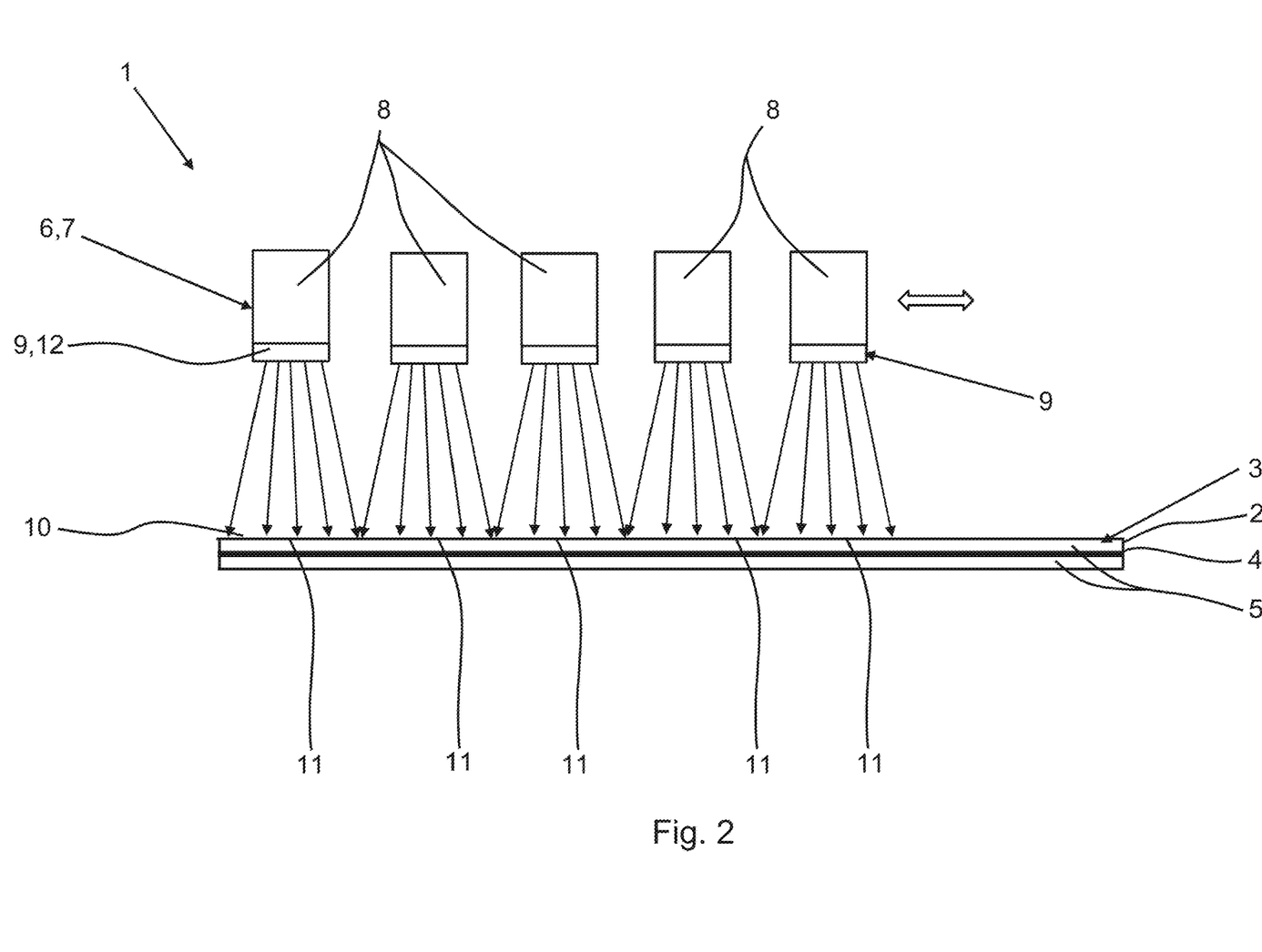
FIG. 2 shows an exemplary embodiment of a device in a side view.

FIG. 2 shows an exemplary embodiment of part of the device 1 in a side view. The heating means 6 in the form of a laser device 7 contains multiple laser beam sources 8 in the form of laser diodes. The beam-shaping assembly 9 has a separate lens 12 for each laser beam source 8 in this exemplary embodiment. FIG. 2 shows that the laser line 10 is composed of multiple individual intensity profiles 11, wherein each individual intensity profile 11 is formed by a laser beam source 8, together with the respective lens 12. By way of example, each individual intensity profile 11 is indicated by multiple arrows starting from the laser beam source 8. The individual intensity profiles 11 form individual laser lines. By overlapping the individual intensity profiles 11, or the individual laser lines, in their edge regions along the dividing line 3, a substantially homogenous beam intensity is ensured over the course of the laser line 10. The laser line 10 preferably has a width of approx. 3 mm.

The laser devices 7 are supported such that they can be oscillated and/or moved groupwise in the direction of the double arrow. The laser devices 7 are either oscillated to homogenize the beam intensity of the laser line 10, or the laser devices 7 are moved along the extension of the dividing line 3, in order to heat the composite film 4 along the dividing line 3.

The lenses 12 form cylindrical lenses, in particular aspherical cylindrical lenses. The lenses 12 act as a collimator, and ensure that the beams emitted from the laser beam sources 8 strike the surface of the composite safety glass panel 2 in the form of substantially parallel radiation in the plane perpendicular to the dividing line—with a slight divergence—at a substantially constant width, such that the laser line 10 acts along the dividing line 3 to heat the composite film 4. The laser device 7 is supported such that the distance between the lenses 12 and the composite film 4 is approx. 70 mm when in operation. Because the laser line 10 is formed by parallel radiation, at least to limit the width of the laser line 10, a slight change in the distance when in operation will be insignificant to the heating.

Figure 3:
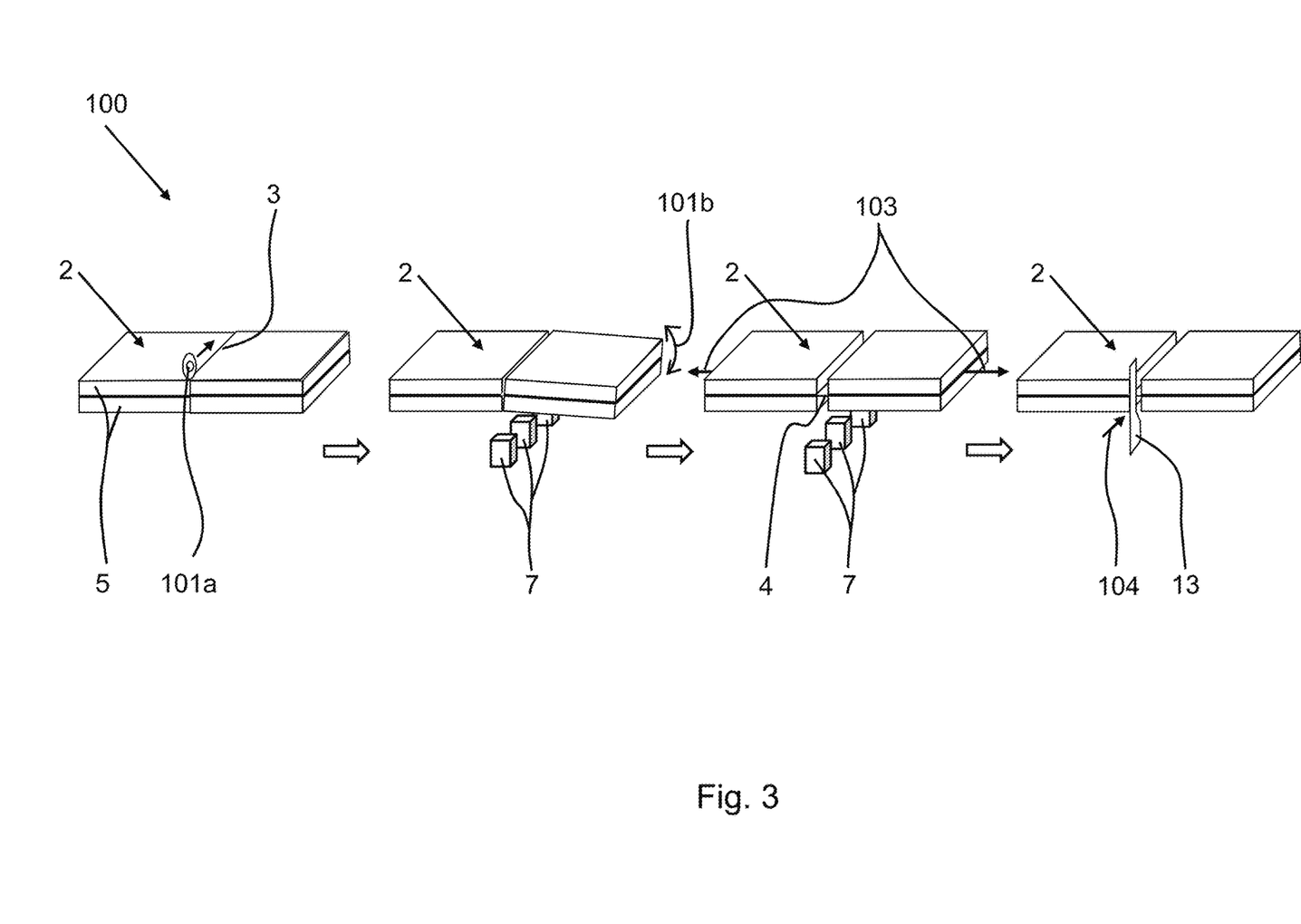
FIG. 3 shows a schematic sequence of a method.

FIG. 3 schematically shows the sequence of a method 100 for separating a composite safety glass panel 2 along at least one dividing line 3. According to the method 100, the glass panels 5 are first separated 101 through mechanical scoring 101a and subsequent breaking 101b of each glass panel in this exemplary embodiment. After or during the breaking 101b, the composite film 4 is heated 102 along the dividing line 3 by means of the laser line 10 formed by the individual intensity profiles 11, which is generated with the laser device 7 that has multiple adjacently arranged laser beam sources 8 and at least one beam-shaping assembly 9. As soon as the composite film 4 is heated to the necessary temperature of, e.g., approx. 170° C., the glass panels 5 are pulled apart 103 by applying a separating force to the glass panels 5, or by holding one part of the composite safety glass panel 2 in place, and applying a force to the other part of the composite safety glass panel 2. The composite film 4 is subsequently separated 104 by cutting it with a blade 13 in this exemplary embodiment, by means of which the composite safety glass panel 2 is subsequently divided along the dividing line 3. Alternatively, it is also provided that the separation 104 of the composite film 4 by pulling the panels apart 103 takes place after the heating 102. The heated, and therefore readily deformed composite film 4 is consequently torn apart along the dividing line 3.

Figure 4:
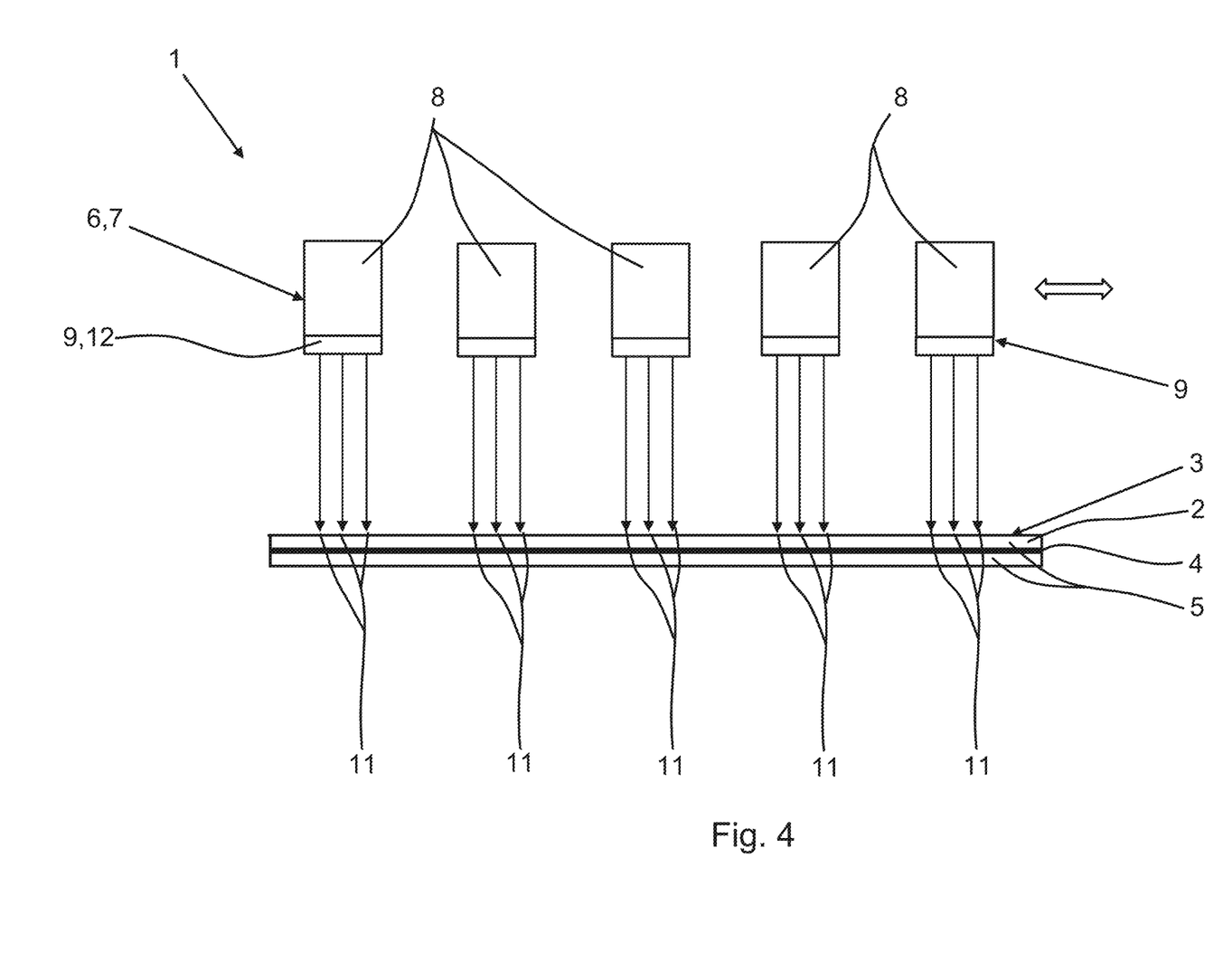
FIG. 4 shows an exemplary embodiment of a device in a side view.

FIG. 4 shows an exemplary embodiment of part of the device 1 in a side view. The heating means 6 in the form of a laser device 7 contains multiple laser beam sources 8. The beam-shaping assembly 9 contains a separate lens 12 for each laser beam source 8 in this exemplary embodiment. Each laser beam source 8 emits three individual intensity profiles 11 that are spaced apart from each other in this exemplary embodiment, which are indicated in FIG. 4 by three separate arrows, by way of example. The individual intensity profiles 11 from two adjacent laser devices 7—the laser beam source 8 and beam-shaping assembly 9, in particular the lens 12—are likewise spaced apart from one another. This spacing can also be selected such that it corresponds to the distance between two individual intensity profiles 11 from a laser device 7, such that all of the individual intensity profiles 11 have the same spacing along the dividing line 3. The individual intensity profiles 11 preferably have a width of approx. 3 mm, orthogonal to the dividing line 3.

The laser devices 7 are supported such that they can oscillate in the direction of the double arrow in the drawing. The laser devices 7 oscillate such that the energy input from two adjacent individual intensity profiles 11 from two adjacent laser devices 7 border or overlap one another, such that a substantially homogenous energy input is ensured for heating the composite film 4 along the course of the dividing line 3.

The lenses 12 form cylindrical lenses, in particular aspherical lenses. The lenses 12 act as a collimator and ensure that the radiation emitted by the laser beam sources 8 strikes the surface of the composite safety glass panel 2 as substantially parallel radiation in the plane perpendicular to the dividing line—with a slight divergence—at a substantially constant width, such that the individual intensity profiles 11 act along the dividing line 3 to heat the composite film 4. The laser device 7 is supported such that the distance between the lenses 12 and the composite film 4 is 70 mm when in operation.

REFERENCE SYMBOLS 1 device
2 composite safety glass panel
3 dividing line
4 composite film
5 glass panels
6 heating means
7 laser device
8 laser beam source
9 beam-shaping assembly
10 laser line
11 individual intensity profile
12 lenses
13 blade
14 coating
100 method
101 separating the glass panels 5
101a scoring
101b breaking
102 heating
103 pulling apart
104 separating the composite film 4

The invention claimed is:

1. A device for separating a composite safety glass panel along at least one predefinable dividing line, wherein the composite safety glass panel has at least one composite film and at least two glass panels, wherein the at least one composite film is placed between the at least two glass panels and bonds the at least two glass panels to one another, the device having:
   at least one separating means for separating the at least two glass panels of the composite safety glass panel along the at least one predefinable dividing line and
   at least one heating means for heating the at least one composite film at least along the at least one predefinable dividing line,
   wherein the at least one heating means contains at least one laser device that has at least multiple adjacently arranged laser beam sources, and in that multiple adjacently arranged individual intensity profiles can be generated with the at least one laser device to heat the at least one composite film at least along a segment of the at least one predefinable dividing line,
   wherein the multiple adjacently arranged individual intensity profiles are configured to heat the at least one composite film to a temperature at which the at least one composite film can be deformed thermoplastically,
   wherein each laser beam source contains at least one laser diode,
   wherein the at least multiple adjacently arranged laser beam sources are supported such that they can be moved along the at least one predefinable dividing line.

2. The device according to claim 1, wherein the multiple adjacently arranged individual intensity profiles form a laser line.

3. The device according to claim 2, wherein the at least multiple adjacently arranged laser beam sources can be controlled individually or wherein the at least multiple adjacently arranged laser beam sources can be controlled in groups, in order to set the number of multiple adjacently arranged individual intensity profiles or a length of the laser line.

4. The device according to claim 2, wherein the multiple adjacently arranged individual intensity profiles overlap at least in part in their edge regions, in order to form the laser line.

5. The device according to claim 1, wherein the at least one laser device contains at least one beam-shaping assembly for forming the multiple adjacently arranged individual intensity profiles.

6. The device according to claim 5, wherein the at least one beam-shaping assembly forms the multiple ad y arranged individual intensity profiles from substantially parallel laser radiation in the direction of at least one axis.

7. The device according to claim 5, wherein at least a part of the at least one laser device and/or the at least one beam-shaping assembly, is supported such that it can oscillate and/or move.

8. The device according to claim 1, wherein a combined length of the multiple adiacently arranged individual intensity profiles corresponds to between 30 times and 1700 times a width of an individual profile or that the combined length of the multiple adjacently arranged individual intensity profiles corresponds to at least a length of the at least one predefinable dividing line.

9. The device according to claim 1, wherein the multiple adjacently arranged individual intensity profiles are straight, or in that at least one individual intensity profile is curved, at least in part.

10. The device according to claim 1, wherein each laser beam source contains an arrangement of multiple laser diodes.

11. The device according to claim 1, wherein an output of the at least multiple adjacently arranged laser beam sources is between 5 W and 50 W, and/or wherein a wavelength of the laser radiation emitted from the at least multiple adjacently arranged laser beam sources is between 1200 nm and 2200 nm.

12. A method for separating a composite safety glass panel, wherein the composite safety glass panel contains at least one composite film and at least two glass panels, wherein the at least one composite film is placed between the at least two glass panels and bonds the at least two glass panels to one another, comprising the steps:
   separating the at least two glass panels along at least one predefinable dividing line;
   heating the at least one composite film along the at least one predefinable dividing line;
   pulling apart the at least two glass panels along the at least one predefinable dividing line; and
   separating the at least one composite film;
   wherein the at least one composite film is heated with multiple adjacently arranged individual intensity profiles along at least one segment of the at least one predefinable dividing line with a laser device that has at least multiple adjacently arranged laser beam sources, wherein the at least multiple adiac ently arranged laser beam sources are supported such that they can be moved along the at least one predefinable dividing line, wherein each laser beam source contains at least one laser diode, and wherein the multiple adjacently arranged individual intensity profiles are configured to heat the at least one composite film to a temperature at which the at least one composite film can be deformed thermoplastically.

13. The method according to claim 12, wherein the multiple adjacently arranged individual intensity profiles collectively form a laser line.

14. The method according to claim 12, wherein the at least one composite film is heated prior to pulling apart the at least two glass panels.

15. The method according to claim 12, wherein the at least one composite film is separated by the pulling apart after the heating thereof.

16. The method according to claim 12, wherein the at least one composite film is heated at least in part during the separation of the at least two glass panels.

17. The method according to claim 12, wherein the at least two glass panels are separated by the mechanical scoring and by the heating of the at least one composite film, or wherein the at least two glass panels are separated by scoring with at least one laser, and by heating the at least one composite film.

18. The method according to claim 12, wherein at least a part of the laser device at least during the heating is oscillated or moved.

19. The method according to claim 12, wherein a combined length of the multiple adjacently arranged individual intensity profiles corresponds to between 30 times and 1700 times a width of the individual profiles or the combined length of the multiple adjacently arranged individual intensity profiles corresponds to at least a length of the at least one predefinable dividing line.

* * * * *

UNITED STATES PATENT AND TRADEMARK OFFICE
CERTIFICATE OF CORRECTION

| | |
|---|---|
| PATENT NO. | : 12,397,539 B2 |
| APPLICATION NO. | : 17/424712 |
| DATED | : August 26, 2025 |
| INVENTOR(S) | : Heinrich Ostendarp et al. |

It is certified that error appears in the above-identified patent and that said Letters Patent is hereby corrected as shown below:

In the Claims

Column 15, Claim 6, Line 6:
Delete "ad y" and insert --adjacently--

Column 16, Claim 12, Line 7:
Delete "adiac ently" and insert --adjacently--

Signed and Sealed this
Fourteenth Day of October, 2025

John A. Squires
*Director of the United States Patent and Trademark Office*